US010133586B2

(12) United States Patent
Graber et al.

(10) Patent No.: US 10,133,586 B2
(45) Date of Patent: Nov. 20, 2018

(54) METHOD TO CONFIGURE, CONTROL, AND DISPLAY DATA PRODUCTS FROM A USER INTERFACE

(71) Applicants: Henry Graber, Weston, FL (US); Alan J Sujovolsky, Weston, FL (US)

(72) Inventors: Henry Graber, Weston, FL (US); Alan J Sujovolsky, Weston, FL (US)

( * ) Notice: Subject to any disclaimer, the term of this patent is extended or adjusted under 35 U.S.C. 154(b) by 54 days.

(21) Appl. No.: 14/675,868

(22) Filed: Apr. 1, 2015

(65) Prior Publication Data
US 2015/0277736 A1 Oct. 1, 2015

Related U.S. Application Data

(60) Provisional application No. 61/973,297, filed on Apr. 1, 2014.

(51) Int. Cl.
G06F 9/451 (2018.01)
G06F 9/44 (2018.01)

(52) U.S. Cl.
CPC .......... G06F 9/451 (2018.02); G06F 9/4443 (2013.01)

(58) Field of Classification Search
CPC .................................... G06F 9/4443
USPC ........................................ 715/771
See application file for complete search history.

(56) References Cited

U.S. PATENT DOCUMENTS

| | | | | |
|---|---|---|---|---|
| 8,019,579 B1* | 9/2011 | Wey | ........................ | G06F 8/10 703/6 |
| 9,557,879 B1* | 1/2017 | Wang | .................... | G06F 3/0481 |
| 2004/0220893 A1* | 11/2004 | Spivack | ............... | G06F 9/4443 706/46 |
| 2006/0031854 A1* | 2/2006 | Godwin | ............... | G06F 3/1462 719/328 |
| 2006/0248449 A1* | 11/2006 | Williams | .................. | G06F 8/20 715/209 |
| 2006/0248451 A1* | 11/2006 | Szyperski | ................. | G06F 8/00 715/209 |
| 2008/0066004 A1* | 3/2008 | Blevins | .............. | G05B 19/0426 715/771 |
| 2009/0183110 A1* | 7/2009 | Murtagh | ................. | G06F 9/451 715/803 |
| 2010/0246101 A1* | 9/2010 | Deokar | ................... | G06F 9/451 361/601 |
| 2011/0185369 A1* | 7/2011 | Huang | .................. | G06F 9/4443 719/321 |
| 2012/0054659 A1* | 3/2012 | Demant | ................ | G06F 9/4443 715/771 |

(Continued)

Primary Examiner — William D Titcomb
(74) Attorney, Agent, or Firm — Defillo & Associates, Inc.; Evelyn A. Defillo

(57) ABSTRACT

The present invention relates to a method, system, or computer application that allows to define a product configuration and using this configuration, manage entirely user experience related to this product, and in particular a method in where a rules engine containing directives, logic and constraints controls without the need of human intervention; the content, form and behavior of the user interface on a computational device. All elements and logic contained in the interface can be controlled directly by individual or multiple sets of rules in the rules engine. Rules can be added, edited and operated on by human or machine agents. Any change in the state of the rules is propagated to the user interface automatically and in real time.

1 Claim, 3 Drawing Sheets

(56) References Cited

U.S. PATENT DOCUMENTS

| | | | | |
|---|---|---|---|---|
| 2012/0296959 | A1* | 11/2012 | Momchilov | G06F 9/54 709/203 |
| 2013/0007652 | A1* | 1/2013 | Dutta | G06F 8/10 715/771 |
| 2013/0145351 | A1* | 6/2013 | Tunik | G06F 9/451 717/135 |
| 2013/0212487 | A1* | 8/2013 | Cote | G06F 3/048 715/745 |
| 2013/0219272 | A1* | 8/2013 | Balasubramanian | G06F 3/023 715/704 |
| 2014/0282135 | A1* | 9/2014 | Segre | G06F 9/4443 715/764 |

* cited by examiner

METHOD TO CONFIGURE, CONTROL, AND DISPLAY DATA PRODUCTS FROM A USER INTERFACE

CROSS-REFERENCE TO RELATED APPLICATIONS

This application claims the benefit of priority to U.S. Provisional Application No. 61/973,297 filed Apr. 1, 2014, the contents of which are incorporated entire herein by reference.

FIELD OF THE INVENTION

The present invention relates to a method, system, or computer application that allows to define a product configuration and using this configuration, manage entirely user experience related to this product, and in particular a method in where a rules engine containing directives, logic and constraints controls without the need of human intervention; the content, form and behavior of the user interface on a computational device. All elements and logic contained in the interface can be controlled directly by individual or multiple sets of rules in the rules engine. Rules can be added, edited and operated on by human or machine agents. Any change in the state of the rules is propagated to the user interface automatically and in real time.

BACKGROUND OF THE ART

There are several state of the art applications which provide solutions to a) create a visual representation of a configurable product; b) generate a user interface UI based on user selected criteria or pre-determined criteria. Until now no solution has attempted to combine these characteristics and extend them to:

a) dynamically generate and control the entire user interface and it's content and behaviors based on rules evaluation;

b) update the rules and/or user experience in real time using human and/or machine agents and streams of big data being generated every nanosecond by the internet of things.

c) or a combination of both of the above. (a+b).

With current technologies when subject matter experts make changes to rules, they then need to communicate with the IT specialists (e.g. UX/UI designers, front end programmers) and request modifications to the user interface to support their changes.

In the case of various personalization systems including CMS (content management systems) and banner ad serving systems, changes to only an element of the UX is made according to pre-determined criteria.

OBJECT OF THE INVENTION

In order to provide a solution to the limitations of the systems of the prior art, the present invention provides a method that allows to configure digital experiences using several sources of information such as intelligent agents, remote services, etc., by means of a direct link between a dynamic rules engine and the total user interface, where the former controls the latter in real time.

Some of the advantages of the invention are the following:

Reducing the time to market of new products and services;

Simplify the process of updating product, process and personalized UI data;

Enabling more complex decision criteria to guide the user and information experience;

Embed decision criteria with data from analytics or AI engines that are updating the rules engine in real time;

Drive UX (user experience) behavior, content and form in real time; and

Enhance and extend the capabilities of existing software development UI (user interface) tools such as HTML5, CSS3, j-Query or other JS frameworks.

Enable the UX/UI to reflect the dynamic changes in the tsunami of big data being generated every nano second by the internet of things that the UI is supposed to represent.

SUMMARY OF THE INVENTION

The present provides a method that allows to configure digital experiences using several sources of information as intelligent agents, remote services, etc. In particular, the invention is a method, system or computer application where a rules engine containing directives, logic and constraints controls without the need of human intervention; the content, form and behavior of the user interface (in other words controlling the entire user experience on said interface) on a computational device. All elements and logic contained in the interface can be controlled directly by individual or multiple sets of rules in the rules engine. Rules can be added, edited and operated on by human or machine agents. Any change in the state of the rules is propagated to the user interface automatically and in real time.

DETAILED DESCRIPTION OF THE INVENTION

Figure 1:
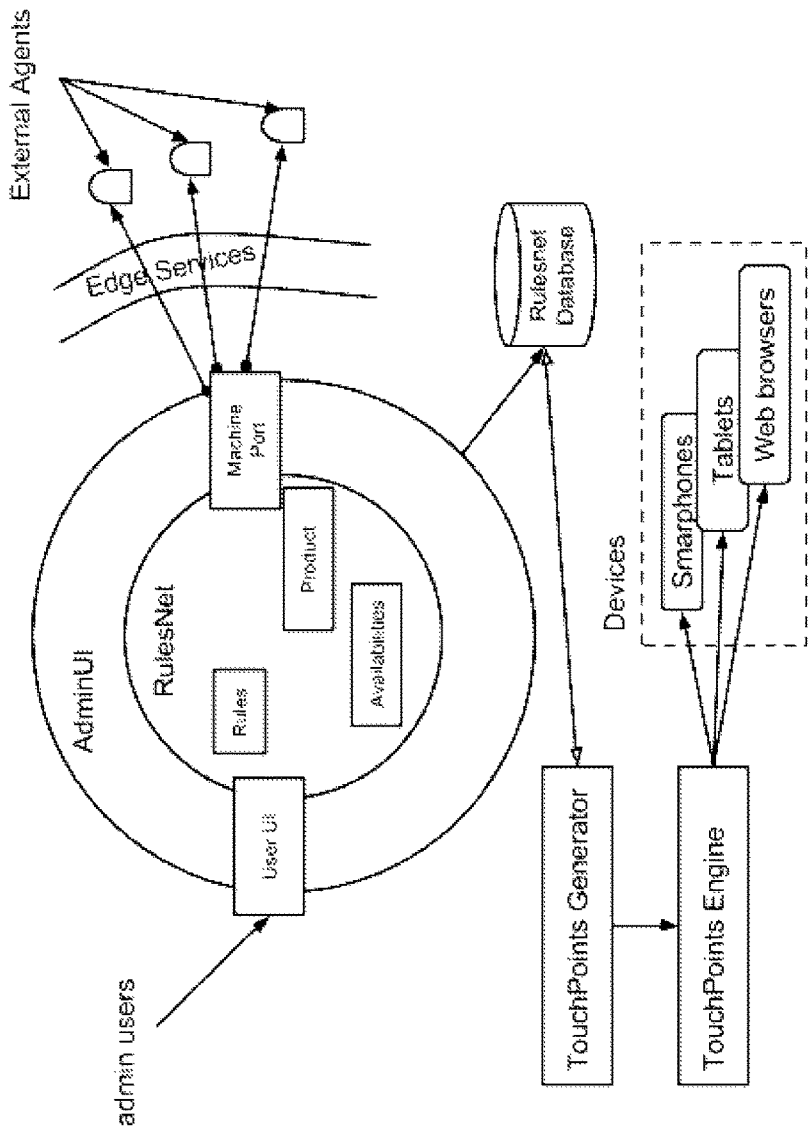
FIG. 1 shows a general diagram of the operational link between the components of the method object of the present invention.

According to the present invention, the Digital Experience Configurator is a process, method, and software that allows a user to model entities and establish rules that govern their behavior. The following tables summarize general characteristics of the method's components.

TABLE I

| | |
|---|---|
| RulesNet | Evaluates the logic and provides product, process, user and options information. This is implemented by means of a software application executed in a computer, that has means of communication with the method's other components. This is modeled as shown in Table II. |
| RulesNet Database | Where the rules information persists and is updated by the rules engine. This is implemented by any existing database application. |
| RulesNet admin. UI | Allows human users and machine to machine interfaces to create, perform operations on and maintain the rules engine. Can be implemented with a computer application that provides access via a browser or via an application programming interface. |

TABLE I-continued

| | |
|---|---|
| Touchpoint Generator | Process that a) translates the directives from the rules engine into a message that is understood by the Touchpoint Engine application which is building the user interface and b) directs user input back to the rules engine. Can be implemented as a software application for each type of device or browser (Pc, Mac, Chrome, iOS, Android, etc). |
| Touchpoint Engine | Interprets the rules from within the client side browser or device to generate the UI/UX. Can be implemented as part of the touchpoint generator or as in independent software application. |

TABLE II

Logical Model of RulesNet Entities and Behaviour
    Categories of Objects. (e.g. clothing)
        Objects (e.g. shirts)
            Components: Part of an entity that has clear purpose (e.g neck, fabric)
            Domains: characteristics and their values that form a component. (e.g: fabric type (jersey, silk, cotton), fabric color (blue, white, green))
Constraints can be:
    Intra-object: within an object. (e.g fabric.type = silk and fabric.color are combinations)
    Inter-object: between objects. (e.g fabric.type = silk and neck.type = v_neck are combinations with different components)
Availability actions can be of:
    Acceptance. (e.g. if fabric.type = silk and fabric.color = red combination is a valid option)
    Rejection. (e.g. if fabric.type = silk and fabric.color = red combination is not valid)
    Acceptance depending on further evaluation.
    Rejection depending on further evaluation.
Rules can be:
    Inter Domain Restriction. (e.g. on fabric.type = silk remove fabric.color => [red, blue])
    Inter Domain Default Object. (e.g. on neck.color = white then set fabric.type = cotton)
    Inter Domain Non-Valued Restriction. (e.g. on neck.color change execute predicate(myPredicate) on fabric.color) where myPredicate. expression = javascript.evalAndApply('fabric.color = external.agent.getTrendyColorByBaseAndCustomer(neck.color, customerEmail))')
Metadata:
    Each element within the system can be associated with metadata that will be used to further model the user experience or complete the involved transaction or exchange.

Figure 2:
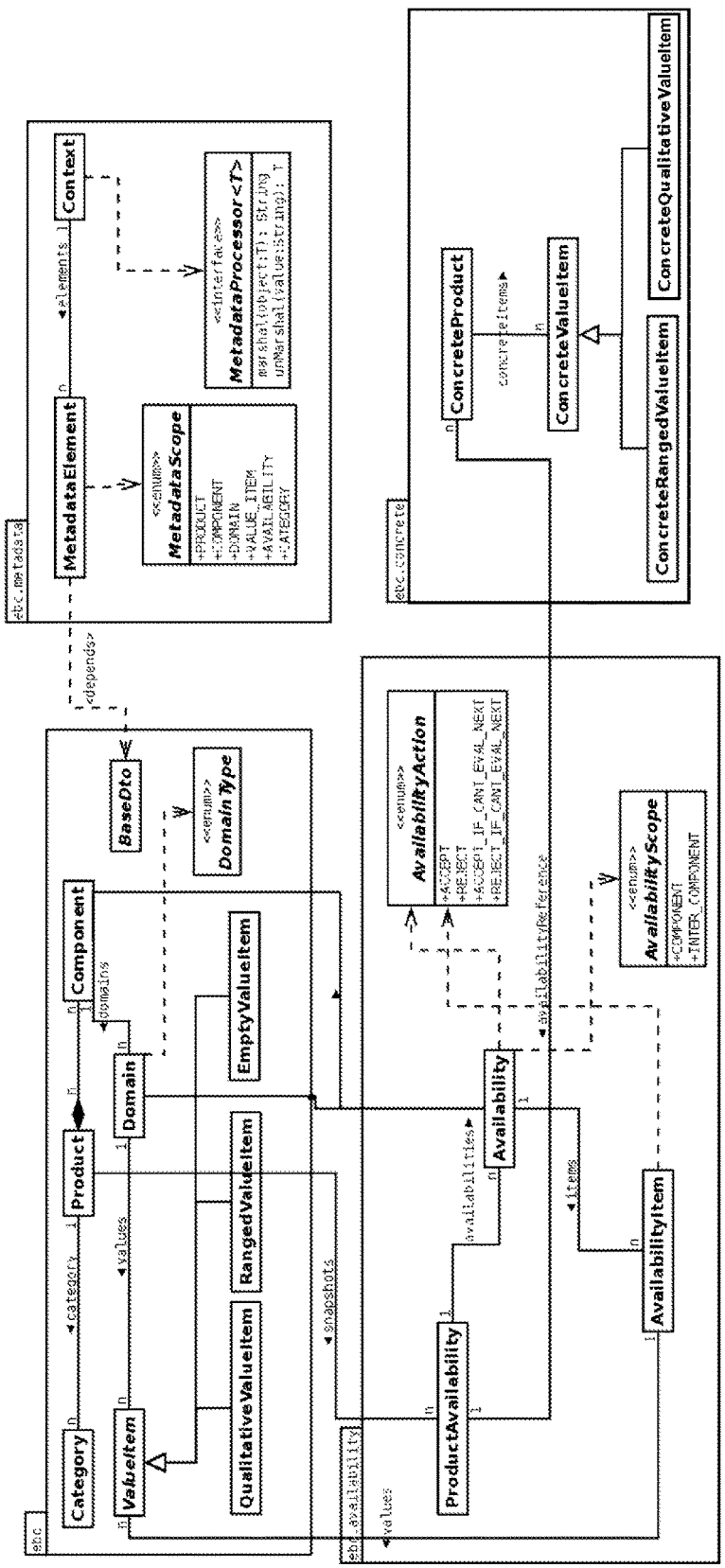
FIG. 2 shows a data model for the database implementation according to the present invention.

FIGS. 1 and 2 illustrate the methods covered by this invention as explained in the following detail.

The interaction flow is configured via two distinct operations:
    a. Entity Configuration: consists in defining the entity as an association of components, domains, values, rules and availabilities.
    b. Digital Experience Configuration: the way the product will be presented to the user. Configuration options, input restrictions and all aspects of user interaction.

a. Product Configuration

To create and configure an entity, the user follows this sequence of operations. These operations are contained within the component RulesNet Admin UI, as mentioned in Table I. (e.g. This is to be implemented as a software application providing access from a console for a human to input the required data or providing access via an application programming interface API) to an external machine agent.)
    1) Create an Entity
    2) Assign a entity Name and entity Description
    3) Create Domains, which are one way attributes of the component(s). These domains may be shared by more than one components. A domain represents all available values to this attribute. A domain maybe qualitative or quantitative. In the first, qualitative descriptors are used to represent the domain, in the second continuous values are presented as discreet ranges and are used to represent the domain. This facilitates the dynamic domain interactions.
        If user selects a qualitative domain value it must enter a value name, canonical name and the value that represents the current quality.
        If user selects a quantitative value, the method allows to define this continue value as it as a ranged value. The user must enter value name, ranks, step and type (decimal/natural) of quantitative value.
    4) Create component. A component is associated to an entity by entering the component name. A component is atomic, real and measurable. e.g. wheels of a bike.
    5) Associate the domain(s): Domain and domain values must be added to this association. Users may add a domain value element constraint that are not allowed on certain component/domain association. This is the case of component/domain/value contradictions as quantitative values (as ranges) that may collision between themselves and produce a non atomic domain value.
    6) The last step of this process is to associate the component with the desired product/services. This is done by creating a link between both.

b. Digital Experience Configuration

This stage of the method is to define the dynamic entity view. The dynamic view is the aspect of this method that allows to model the behavior of the universal entity definition. The model is created by following a 2 step process:
    1. Constrain the universe of possible entity configurations
    2. Create and add rules to control entity behavior
    3. [optional] Create and add business custom metadata.

Creating the Universe of Possible Entity Configurations

An availability is a valid combination of component/domains/values. They are grouped/organized in clusters within an entity. To create one, users have to add it to entity availability snapshots.

Entities can have multiple availability snapshots according that respond to different business rules/constraints. e.g. entity behaviors may change on a given date or given conditions.

Availabilities are created by defining the following:
    1) Availability scope (component/intercomponent),
    2) Associated component(s) (one for scope component, many to intercomponent)
    3) Default action
    4) Evaluation priority Next, user must add availability items selecting a combination of domain/values[3] and the behavior that touchpoints engine should follow when this combination is selected. The allowed behaviors for availabilities or availability items are:

Reject: Selected combination must be rejected
Accept: Selected combination must be accepted
Reject if cant eval next: Combination should be rejected in case of not exist other availability that fits in this combination. (this may happen on inter component availability definitions that may collision with another availability definitions. so, the method forces to indicate the evaluation priority and the first combination found may block (or not) the evaluation of the next element (if it exists)

Accept if cant eval next: same as previous, but the combination is accepted

Create and Add Rules to Control Entity Behavior

A rule is an extension of an availability, that allows to create another kind of behaviors as default value set according to selected values or applying constraints and predicates. Rules also be associated to a entity availability snapshot.

This method allows organizing entity rules into a tree structure.

To create a rule users must enter:
1) name.
2) acceptance (addition or subtraction).
3) priority.
4) type. (defines the UI behavior)
   Type 1=Inter domain default object (IDDO): Represents default value that a domain (A) is going to take in case of other domain (B) change. where A!=B.)
   Type 2=Inter domain restriction (IDR): Constrains (according to rule acceptance) values between domain(s). where a selection change on domain (A) using values (VA1, VA2 . . . VAx) must add (or sub) in domain (B) the following values (VB1, VB2 . . . VBy). where A!=B.
   Type 3=Inter domain non valued restriction (IDNVR): similar to IDR but a when a domain change occurs a predicate is applied on the domain (B) values.
5) Select the component/domain/[values] that rule is applied to.
6) Select a predicate (see following explanation)

Predicates

Predicates are expressions that can be executed on domains. These expressions are described in proto-languages as javascript and is a mechanism to define business rules and access external sources of information.

Per method specification, the predicate expressions must be executed on the touchpoints engine. If the destination platform does not support javascript-like expressions, touchpoints engine is going to use predicate names to execute those behaviors.

Create and Add Business Custom Metadata

The method also allows to define variable data (structure free) associated to specific business logic. This information can be attached to any data structure shown on FIG. 2. An external agent (human or machine) can update associated metadata (e.g. inventory on hand) within the availability item structure. This change may trigger execution (according to rules and predicates) business behaviors on the UI. (e.g if inventory on hand is zero, switch availability item from accept to reject; the item it will not be longer available to be selected on configuration)

[3]The current definition of component/domain/value definition is a NP-Complete problem. The order or complexity of the solution is about $$(O)=(O\hat{}(Cr*Dr*Vr)). \text{ wherein:}$$

Cr is the component vector range,
Dr is the associated range of domain vector and
Vr is the associated range of domain value vector.

An availability uses an accept or a reject criteria, therefore the equation can be written as $(O)=(O\hat{}(Cr*Dr*Vr))/2$ where the division by two is related to amount of information (theory of information) when rejects or accepts the availability. So the worst case occurs when the size of availability vector (using acceptance) is equals to the reflected (or negative) availability vector (using rejection). Av(ex, accept)~Ac(ex,reject).

Generating the Digital Experience

Figure 3:
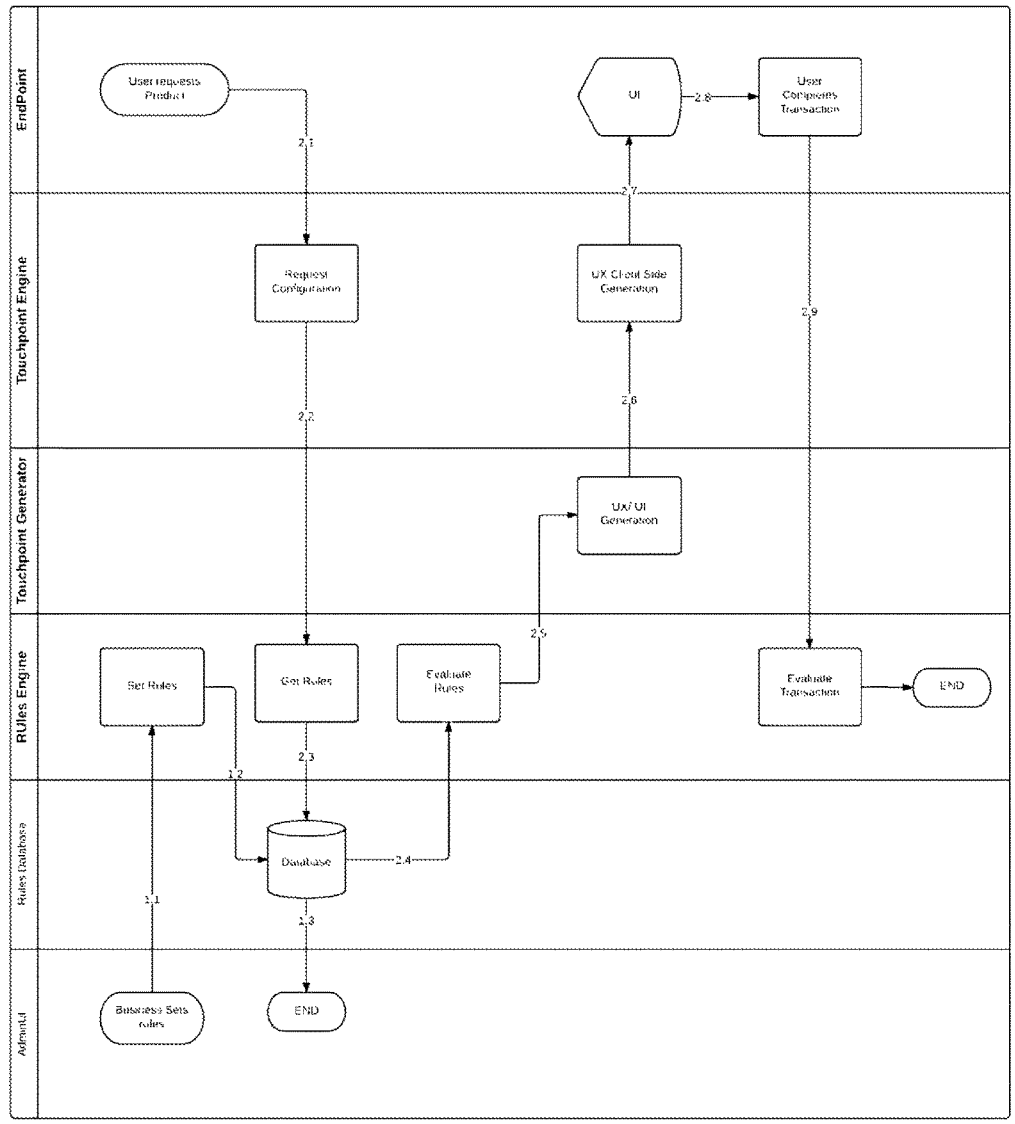
FIG. 3 shows a flowchart of the method of the present invention.

The method workflow shown on FIG. 3 explains how method components interacts between themselves to generate a UI/UX that can be controlled using declared static and dynamic views.

The diagram from FIG. 3 is a UML sequence artifact. is using trails to define sections and scopes. the sections are identified as: AdminUI, Rules Database, Rules Engine, Touchpoint Generador, Touchpoint Engine and Endpoint Initially the workflow needs a previous definition of entities inside administration UI 1.1 (primarily data structures as domains/values, components, entities availability, entities rules). The business rules are stored in rulesnet database 1.2. This database is a abstract storage implementation where its possible to implements different database engines (as RDBMS (sql) or Document based (no-sql)) without expensive business change.

When an endpoint requests a new configuration 2.1, the engine takes cares of authorization and authentication in the remote services where rules engine is running 2.2 and gets all entity data from a single publication (static and dynamic views with (or not) embedded metadata) 2.3 then the engine evaluates/executes all rules that may update the dynamic view output 2.4. the output 2.5 of rulesnet (static and dynamic view) is used to generate a correct UX/UI associated to broker platform (web/mobile/etc).

The UI its rendered in endpoint platform 2.7. the user may see/use the generated UI at the end of a transaction 2.8 it represents that the user has selected a valid entity configuration (according to static/dynamic view). after that the rule engine will validate the selected configuration 2.9. with a valid configuration the broker can continue with its use case.

The mechanisms that control the endpoint platform 2.7 have been extensively explained in FIG. 1 and FIG. 2.

What we claim is:

1. A method to define at least one product comprising the steps of:
   providing a human user, in an administrator or a creator role, access to a user interface via a browser window or an executable application to input information about a specific product;
   providing a machine agent, in an administrator or a creator role, access to an interface via a machine to machine protocol to input an information about the specific product;
   translating the human user input into rules about the at least one product with an external processor executing a User Interface (UI) broker: categorizing by subject, assigning a name, compiling components, compiling values, and determining availability;
   storing the newly created rules into a database,
   executing a computer program, the UI broker, on the local device where interaction with a human agent occurs;
   generating a visual representation of the product data on the UI broker with all static and dynamic elements to allow the human user interaction;
   providing a machine to machine interface that links the UI broker executing the product program with the stored rules on the database;
   triggering a query in the rules engine about the stored rule for the corresponding specific product requested by the UI broker;
   determining at least one stored rule for the corresponding specific product;
   comparing, by using a computer, the stored rule that applies to the state of the corresponding specific product to generate the actions on the UI broker;

visualizing the actions on the UI broker to generate a dynamic user experience/user interface;
providing the machine agent, in an administrator or creator role, access to the interface via machine to machine protocol to input changes or new information about the already existing specific product; and
updating the rules on the database.

\* \* \* \* \*